(Model.)
J. C. POWELL.
VELOCIPEDE.
No. 368,167. Patented Aug. 9, 1887.
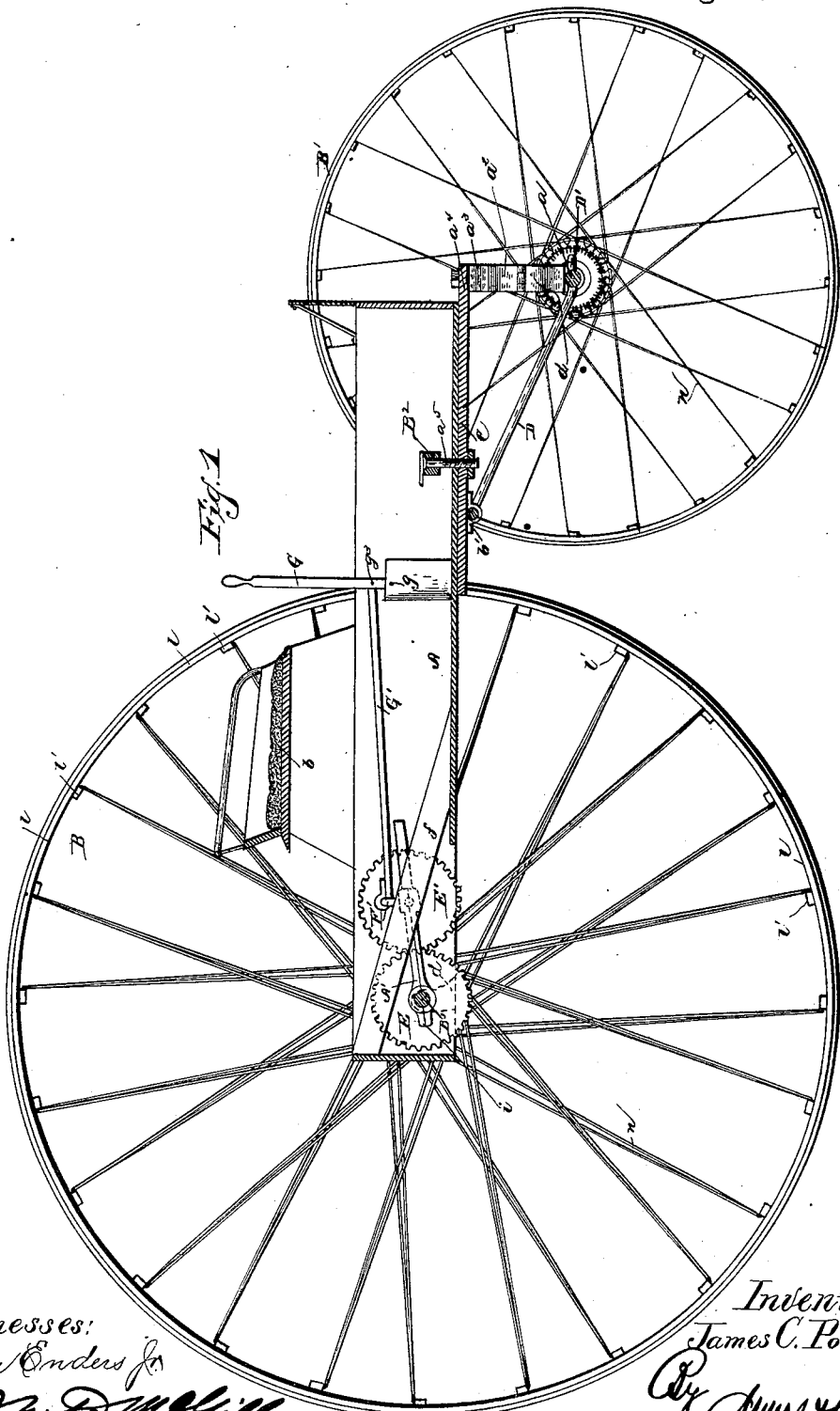
Witnesses:
John Enders Jr.
Inventor:
James C. Powell

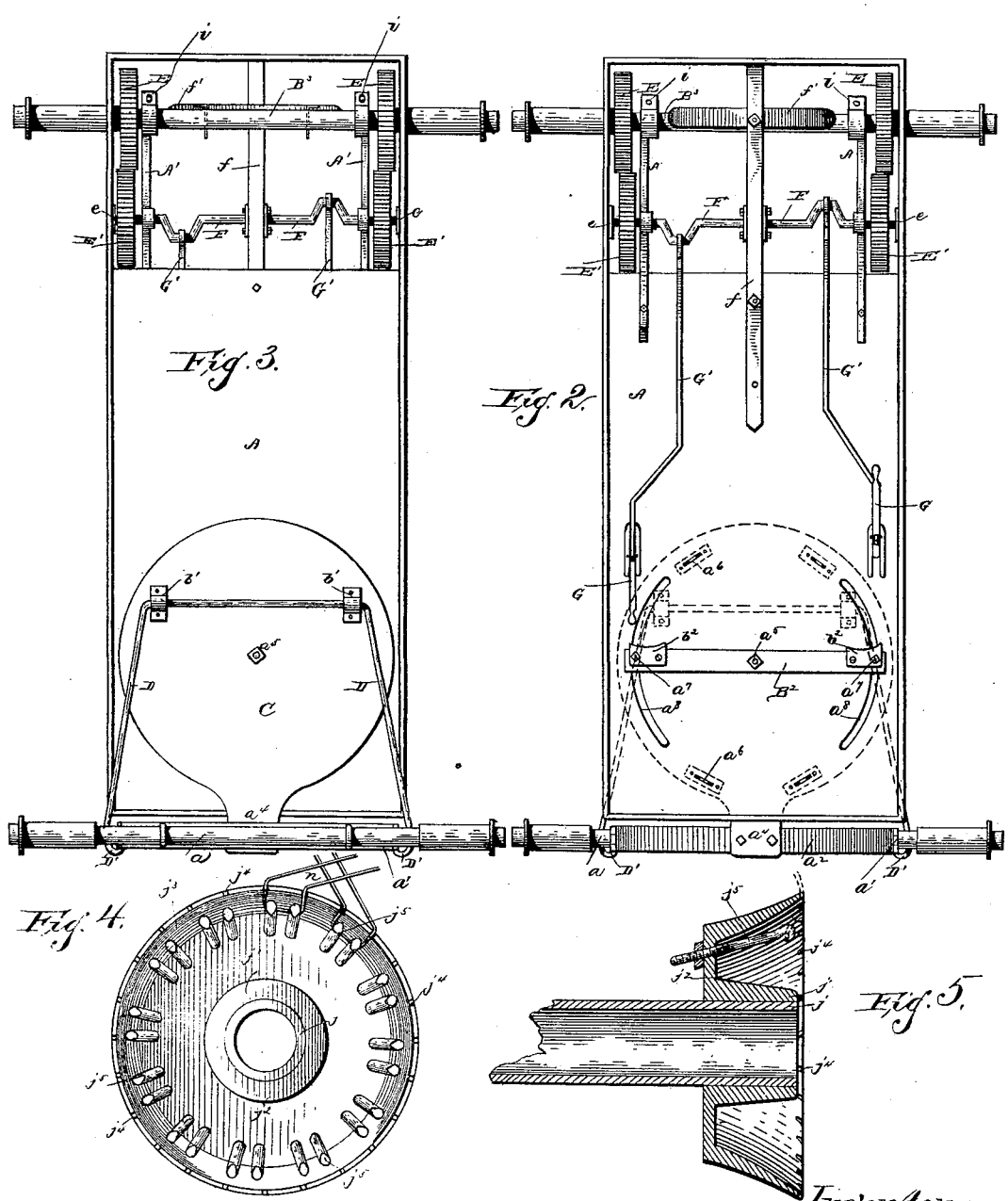

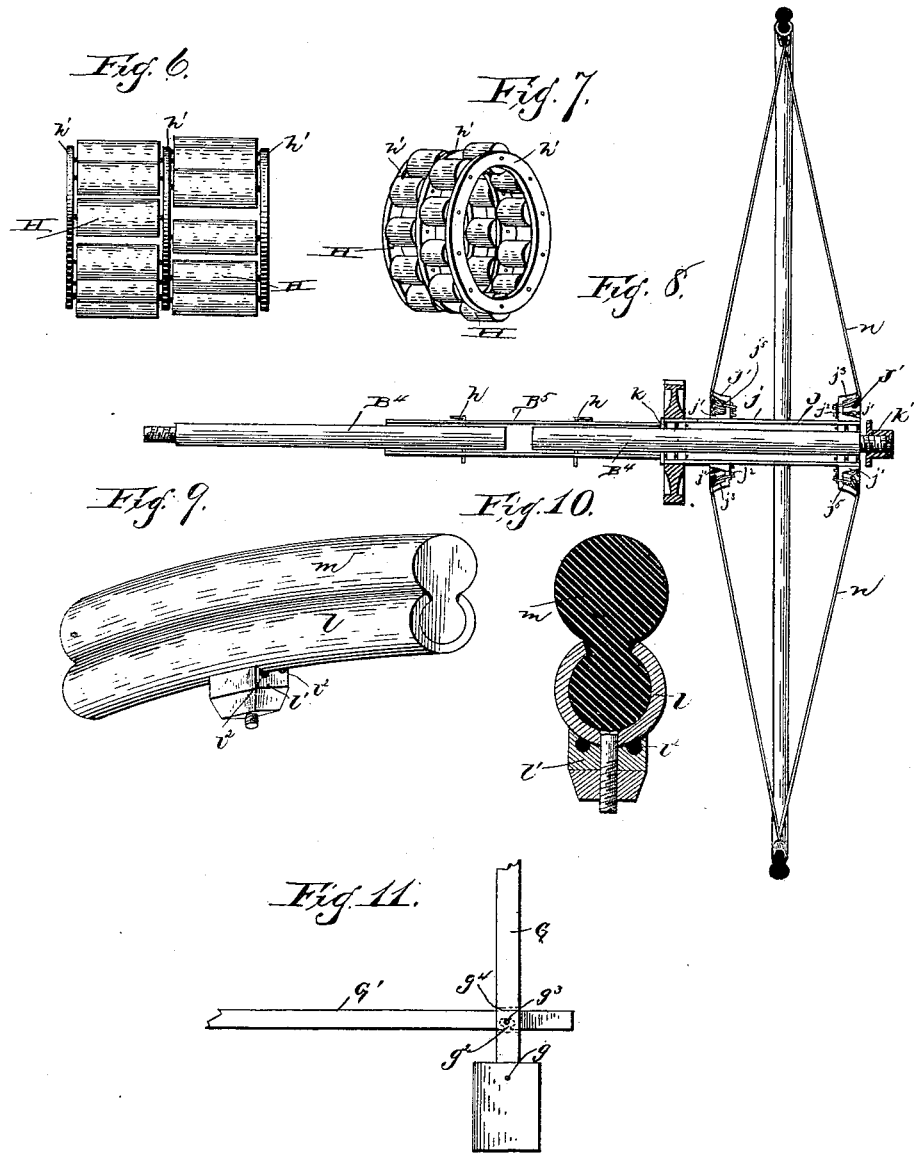

UNITED STATES PATENT OFFICE.

JAMES C. POWELL, OF DANVILLE, VIRGINIA.

VELOCIPEDE.

SPECIFICATION forming part of Letters Patent No. 368,167, dated August 9, 1887.

Application filed March 2, 1887. Serial No. 229,443. (Model.)

*To all whom it may concern:*

Be it known that I, JAMES C. POWELL, a citizen of the United States of America, residing at Danville, in the county of Pittsylvania and State of Virginia, have invented certain new and useful Improvements in Hand-Propelling Vehicles, of which the following is a specification, reference being had therein to the accompanying drawings.

This invention has relation to improvements in hand-power-propelled vehicles, the same being propelled by the occupant and with great facility and speed; and it consists of sundry combinations of parts, including their construction, substantially as hereinafter set forth, and pointed out in the claims.

In the accompanying drawings, Figure 1 is a longitudinal sectional elevation of my improved vehicle. Figs. 2 and 3 are respectively top and bottom plan views thereof with the wheels removed; and Figs. 4, 5, 6, 7, 8, 9, 10, and 11 are detail views thereof.

In the embodiment of my invention I employ a body, A, which is mounted upon four wheels, B B', and supplied with a suitable seat, $b$, for the occupant or rider. The forward wheels, B', have their axles $a$ connected to a semi-elliptic spring, $a'$, in turn connected to an elliptic spring, $a^2$, secured to a bolster, $a^3$, bolted to a projection or extension, $a^4$, of a disk or plate, C. The latter is centrally connected to the usual king-bolt, $a^5$, and resting against frictional rolls $a^6$, journaled in boxes secured in the bottom of the body A. Said king-bolt is disposed well in rear of the front axle, which has advantages over the ordinary juxtaposition of the king-bolt and the front axle, in that the vehicle can be more readily guided by the foot applied to either end of the foot steering-bar, presently referred to.

The disk or plate C is connected to the front axle, $a$, by the bail or brace D, with its cross-bar held to said plate or disk by staple-like boxes $b'$, bolted to the latter, and with its forward ends passed around said axle near the wheels, and bent or curved to form upon the front side of the axle foot supports or steps D' D', to enable the person to readily mount and enter the vehicle with either forward wheel "cramped."

B² is a foot-steering lever or bar centrally pivoted upon the king-bolt $a^5$ within the body A, and connected at its ends to the disk or plate C by rods or bolts $a^7$, passing through and moving in slots $a^8$ in the bottom of the body A, which slots are each the arc of a circle and opposed to each other. The foot steering bar or lever B² is provided with foot-plates or stirrups $b^2$, bolted thereon at its ends, as shown in Fig. 2. The rear wheels, B, have their axle B³ disposed within the body A, the same being passed from the lower side up into and projecting through openings $d$, indenting the sides of the body from the lower edges, the body being bottomless at that point, as seen in Figs. 2 and 3, the purpose of which will more fully appear hereinafter.

The hubs of the rear wheels, B, carry gear-wheels E E, which gear with other similar smaller wheels, E' E', secured upon crank-shafts F F, supported in boxes carried by standards $e$, bolted to the sides of the body A and in boxes secured to opposite sides of a central bar, $f$, bolted to the upper side of the body-bottom for a portion of its length and to the back end of the body at its extreme rear end and to a semi-elliptic spring, $f'$, a short distance from its said latter end, the ends of which spring rest upon the rear axle, B³, the object of which will appear farther on.

The crank-shaft F and the rear axle, B³, are connected together, so as to retain the same parallel and the gear or cog wheels E E', arranged upon the axle and shaft, respectively, properly intermeshed by sectional connecting-bars A' A', the sections of each connecting-bar being held together by screw-bolts $i$ $i$, passing through the same near the axle and shaft, and clamping said sections upon the two latter. The upper connecting-bar, A', is extended some distance beyond the forward end of the lower corresponding bar, and is loosely connected at its forward end by means of a nutted bolt to the wagon-body, as shown in Figs. 2 and 3. The screw-bolts $i$ by tightening enable the taking up or compensating wear as the same takes place. It will also be seen that by means of this arrangement when the axle proper is taken apart the connecting-bars A' A', with the axle-inclosing sleeve, presently referred to, will remain intact and be allowed to bodily depend.

G G are hand-levers connected in the usual way by rods G' G' to the oppositely-disposed cranks of the shaft F. The lower ends of the levers or handles G G are each pivoted by a pin, $g'$, in an approximately U-shaped plate or socket, $g$, bolted to the bottom of the body A. The connection between each connecting-rod G' and lever or handle G is effected by providing a notch or recess, $g^2$, in the under side of the rod, which receives a pin, $g^3$, passed through the lever or handle, the latter having a slot or opening, $g^4$, through which is passed the end of the rod to permit the pin $g^3$ to pass into its notch or recess $g^2$. By means of this arrangement it will be seen that by lifting the rods G' at their points of connection with the handles or levers they can, if desired, be detached from the connecting pins and levers.

The axle proper, $B^3$, is made in sections or two parts, $B^4 B^4$, which are inclosed intermediately of the wheel-hubs within a thimble or sleeve, $B^5$, connected to the axle-sections $B^4 B^4$ by means of bent or angular pins $h$, passed transversely through the sleeve and axle sections, whereby the said axle-sections can be readily taken apart and removed for any purpose desired—as, for instance, to economize space in shipping or packing the vehicle, in which case the sleeve and connecting-bars A' A' will depend or hang, as before indicated.

It will here be remarked that when the handles or levers G G are grasped and forced forward or backward, and while the cog or gear wheels E E' are intergeared, the cog or gear-wheels E' will be raised or lifted a greater or less extent, thus lifting body A by the connection between the same and the crank-axles F, carrying the wheels E' and slightly lifting the spring $f'$ from the rear axle, $B^3$, whereby all weight of vehicle-body and occupant will in practice be thrown several inches forward of center of rear wheels or their axle, causing wheels to turn forwardly, being on the ground at their lowest extremity. The application of only sufficient power to the handles or levers G to enable the raising of said weight by short leverage, being effected and kept up, will cause the vehicle to travel with great speed.

The wheels comprise each a hub, $j$, upon which are fitted and secured two collars, $j'$, one at each end, and which is held upon one end of an axle-section, $B^4$, between a washer, $k$, and a nut, $k'$, the former being placed upon said axle-section up against one end of the axle-sleeve $B^5$, while the latter (the nut) is screwed upon the end of the axle-section. Each collar $j'$ is provided at its inner end with a circular or annular flange, $j^2$, (see Figs. 4 and 5,) having formed upon its periphery a slightly outwardly-flared rim, $j^3$, provided in its outer edge entirely around its circumference with notches or recesses $j^4$, the purpose of which will appear farther on. Arranged within the annular space bound by the collar proper, $j'$, and the rim $j^3$ at each end of a hub are disposed in pairs or twos hooks $j^5$, bolted to the flange $j^2$, the same being arranged nearly coincidently with the notches or recesses $j^4$, for the purpose presently seen.

The felly portion of the wheel consists of a peripherally slotted or split tube, $l$, through the slot of and into which is inserted and compressed, to the extent of about half its cross-section, the elastic tire or rim $m$, the same being thus effectively held therein.

Throughout the inner circumference of the felly-tube $l$, at suitable intervals apart, is disposed a series of block or brackets, $l'$, having in their surfaces next to the felly grooves or channels $l^2$, and which blocks are bolted to the tube $l$, as clearly shown in Fig. 10. The spokes $n\, n$ consist of two wires passed in opposite directions (see Figs. 1 and 5) and looped upon a pair of hooks, $j^5$, and the two parts thus produced are carried to the felly blocks or brackets $l'$, (see Fig. 1,) thence back to the hub, around two other hooks, $j^5$, again to the felly-tube, through another block, $l'$, back to the starting end of hub, around other hooks, $j^5$, omitting two hooks for the wire passed in the reverse direction, and so on entirely around the wheel back to starting-point on the hub, where the ends of wire are fastened together. The tension of the wires or spokes is obtained by tightening up the nuts at the bolted ends of the hooks $j^5$.

H H are two or double series of frictional rolls journaled between parallel rings $h'$, all constituting a frictional bearing, one such bearing being disposed in each end of a hub, $j$, upon the axle-section or axle proper, lessening friction and the use of lubricant, rendering the vehicle more easy-traveling, and thus promoting the comfort of the occupant.

Having thus fully described my invention, what I claim, and desire to secure by Letters Patent, is—

1. In a hand-power-propelled vehicle, the combination, with the driving-wheels carrying gear or cog wheels, of the crank-shafts supported upon the vehicle-body and carrying gear or cog wheels, the handles or levers connecting with said crank-shafts, and the sectional bars connecting said crank-shaft and axles, substantially as and for the purpose set forth.

2. In a hand-power-propelled vehicle, the combination, with the crank-shafts carrying gear or cog wheels and actuating contrivances therefor, of the driving-wheel shaft formed in sections with an inclosing-sleeve, and the driving-wheels carrying cog or gear wheels and connected by pairs of sectional bars to the crank-shaft, substantially as and for the purpose set forth.

3. The combination, with the driving-wheels carrying cog or gear wheels and the crank-shafts, also carrying cog or gear wheels, and mechanism for actuating said shafts, of the spring resting upon said axle and centrally secured to a longitudinal bar fastened to the vehicle-body and furnishing a support for the bearing or boxes of the inner ends of the crank-shafts, substantially as and for the purpose set forth.

4. The combination, with the vehicle-body and front axle and bolster, of the disk or plate centrally pivoted upon the king-bolt and traveling on resting rolls hung in the bottom of the vehicle-body, the foot steering bar or lever connected to said disk or plate, and the bail or brace applied to said disk or plate and front axle, substantially as and for the purpose set forth.

5. The combination, with the traveling disk or plate connected to the king-bolt and the front axle, of the bail or brace applied to said disk or plate and axle, and having its forward ends curved beyond the front side of said axle and forming steps or foot-supports, substantially as and for the purpose set forth.

6. The wheel comprising hubs having notched rims and hooks, the felly portion having recessed or channeled blocks or brackets, and spokes formed of wires passed in opposite directions and applied to said hooks and blocks, substantially as shown and described.

In testimony whereof I affix my signature in presence of two witnesses.

JAMES C. POWELL.

Witnesses:
   THOS. I. THOMPSON,
   LOUIS M. BYRNE.